(12) United States Patent
Gunnarsson et al.

(10) Patent No.: US 6,373,628 B1
(45) Date of Patent: Apr. 16, 2002

(54) OPTICAL SIGHT WITH AN ILLUMINATED AIMING POINT

(75) Inventors: Kjell Gunnarsson, Höör; Anna Delfin; Håkan Håkanson, both of Lund, all of (SE)

(73) Assignee: GS Development AB, Malmo (SE)

( * ) Notice: Subject to any disclaimer, the term of this patent is extended or adjusted under 35 U.S.C. 154(b) by 0 days.

(21) Appl. No.: 09/807,321

(22) PCT Filed: Feb. 16, 2000

(86) PCT No.: PCT/SE00/00299

§ 371 Date: Apr. 11, 2001

§ 102(e) Date: Apr. 11, 2001

(87) PCT Pub. No.: WO00/50835

PCT Pub. Date: Aug. 31, 2000

(30) Foreign Application Priority Data

Feb. 22, 1999 (SE) ................................................ 9900612

(51) Int. Cl.⁷ ............................................. G02B 23/00
(52) U.S. Cl. ........................ 359/428; 359/399; 359/428; 33/241
(58) Field of Search .................... 359/399, 425–428; 33/241–252; 42/1.01–1.02, 103, 132

(56) References Cited

U.S. PATENT DOCUMENTS

| 3,833,799 | A | * | 9/1974 | Audet ........................... 33/241 |
| 4,330,706 | A | | 5/1982 | Lawenhaupt ........... 250/214 VT |
| 4,665,622 | A | | 5/1987 | Idan ............................. 33/241 |
| 5,373,644 | A | | 12/1994 | DePaoli ........................ 33/241 |
| 5,483,362 | A | * | 1/1996 | Tai et al. ....................... 359/1 |
| 5,594,584 | A | | 1/1997 | Kay et al. .................... 359/433 |
| 5,735,070 | A | * | 4/1998 | Vasquez et al. ............. 42/1.02 |
| 5,914,775 | A | * | 6/1999 | Hargrove et al. .......... 356/3.13 |

FOREIGN PATENT DOCUMENTS

| EP | 651225 | * | 5/1995 |
| GB | 2 276 015 | | 9/1994 |
| SE | 449 262 | | 4/1987 |
| SE | 464104 | * | 11/1990 |

* cited by examiner

*Primary Examiner*—Thong Nguyen
(74) *Attorney, Agent, or Firm*—Merchant & Gould P.C.

(57) ABSTRACT

A device by an optical sight with a light tunnel (10, 11). A light emitting diode is received in the light tunnel providing an illuminated aimpoint in the light tunnel. An element sensitive to the ambient light is provided in the light tunnel for controlling the brightness of the aimpoint in dependence of the intensity of the ambient light.

8 Claims, 2 Drawing Sheets

OPTICAL SIGHT WITH AN ILLUMINATED AIMING POINT

FIELD OF THE INVENTION

The invention relates to an optical sight with a light tunnel, a light emitting diode mounted in the light tunnel for producing an illuminated aimpoint visible in the light tunnel, and an element sensitive to the ambient light for controlling the brightness of the aimpoint in dependence of the intensity of the ambient light, the brightness being reduced in a dark environment so that the shooter does not get dazzled by the illuminated aimpoint, and increased in a bright environment so that the aimpoint will be seen better against the bright background.

A sight of this kind is disclosed in SE-B-449 262. The sight includes an oscillator producing a pulsed current to operate the light emitting diode, and a photoresistor sensitive to the ambient light for controlling the oscillator frequency and pulse length in dependence of the ambient light. It is not indicated where this photoresistor shall be located.

A sight of the kind referred to above is characterized in that the element sensitive to the ambient light, the light sensor, is placed in the light tunnel. This element will thereby detect the ambient light exactly in the area that the shooter aims at when he looks through the light tunnel and places the illuminated aimpoint visible therein, on the designated target. A more adequate control of the brightness of the aimpoint in relation to the ambient light is obtained when the field of view of the light sensitive element is limited to the target area and integrates the light therein. To place a photoresistor in the light tunnel is out of the question since the dimensions of a photoresistor are large, of the order of 5 mm, and the photoresistor hence would interfere with the view through the light tunnel, whereas a photo diode is well suited for this placement since the dimensions of the photo diode are of the order of 0.2 mm, and the photo diode therefore will not cause any such interference. In addition to control of the brightness of the aimpoint being improved by the sight according to the invention this sight is advantageous in that it consumes less power than the known sight with a pulsed light source.

A sight with a light emitting diode is disclosed in U.S. Pat. No. 4,665,622, and a power supply circuit for controlling emission of a light emitting diode is disclosed in U.S. Pat. No. 4,330,206.

Preferably, the light sensitive element is arranged in the close vicinity of the light emitting diode.

BRIEF DESCRIPTION OF THE DRAWINGS

An illustrative embodiment of the sight according to the invention will be described in more detail in the following with reference to the accompanying drawing, in which.

DETAILED DESCRIPTION OF THE INVENTION

Figure 1:
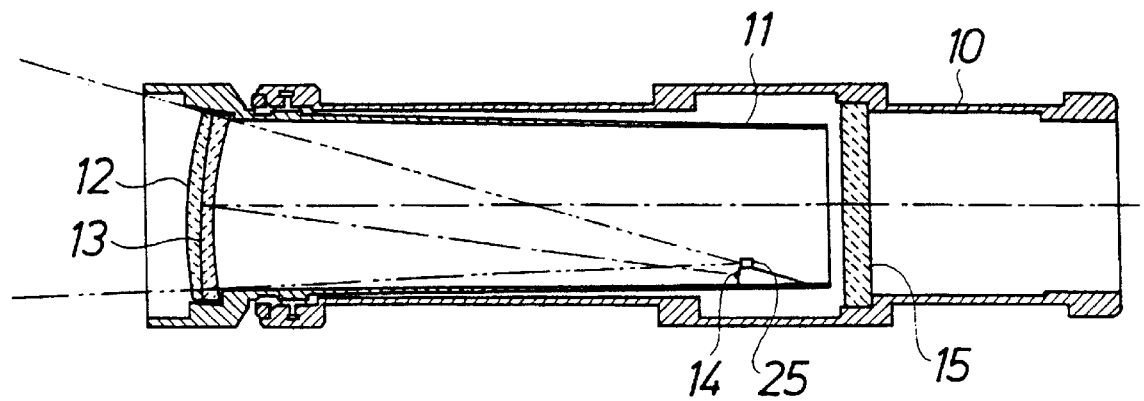
FIG. 1 is a schematic cross sectional view of an optical sight, taken axially through the tube, which forms the light tunnel of the sight, and illustrates the functional principle of the sight.

The sight comprises a light tunnel which is formed by an outer tube 10 to be attached to the barrel of the shotgun on which the sight is to be used. Mounted in said tube is an inner tube 11 with one end fixed to the outer tube and the other end fixed to an adjustment device, not shown here, for adjustment of the longitudinal axis of the inner tube relative to the longitudinal axis of the outer tube to the extent required to adapt the sight to the shotgun on which it is to be used. At said one end of the inner tube a double lens 12 is mounted with a coating 13 between the lenses reflecting red light. Inside the inner tube a light source 14 is provided comprising a light emitting diode which directs a beam of red light towards the coating 13 reflecting the light beam through a surface ground glass plate 15 with anti reflective coating facing the right end of the light tube, as indicated by dot and dash lines in FIG. 1. When the shooter looks at the target through the light tunnel from this end, he sees a red dot which he puts on the spot on the target, where he wants the impact to take place.

Figure 2:
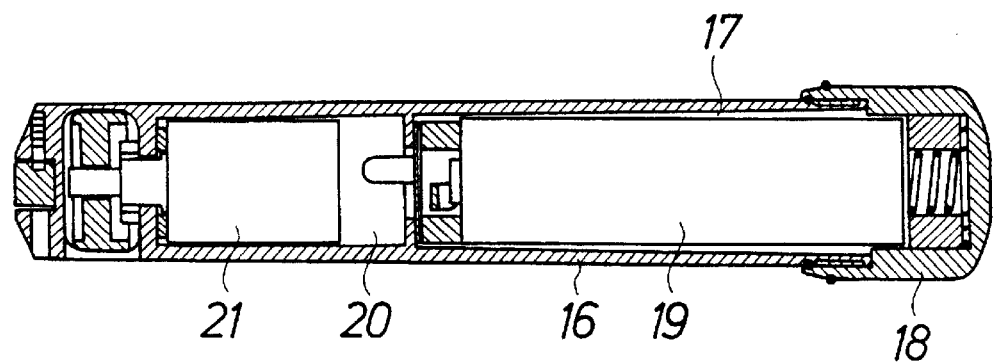
FIG. 2 is an enlarged axial cross sectional view of the battery housing of the sight.

On the outside of the outer tube 10 a battery housing 16 is provided, FIG. 2, which can be made integral with the outer tube, or made as a separate part and attached thereto. The battery housing can have its longitudinal axis substantially parallel to the longitudinal axis of the outer tube or at an oblique angle thereto. In the battery housing, a cylindrical battery chamber 17 is provided, closed at one end thereof by a screw lid 18 and dimensioned to leave room exactly for a conventional penlight battery 19 of the type AA according ANSI with the voltage rating 1.5 V. This voltage is delivered by the battery through conventional connectors in the battery chamber. The battery housing also comprises a chamber 20 in which the electrical circuit system 21 of the sight for operating the light emitting diode is received. This circuit system will be described in more detail with reference to FIG. 3.

The battery 19 is connected to a step-up transforming circuit 22 which is built in a way known per se, based on a DC/DC-converter LT® 1307 from Linear Technology Corporation, USA, indicated at 23. In addition to the DC/DC-converter 23, the transforming circuit 22 includes resistors R1–R3, capacitors C1–C3, inductor L1, and diode D1, arranged in a known way. With the step-up transforming circuit 22, the voltage supplied to the light emitting diode 14 may thus be increased to at least 1.6 V. The output voltage from the circuit 22 in the case illustrated in FIG. 3 is 3.3 V, i.e. a potential higher than that needed for controlling the light emitting diode, and is tapped off at a terminal post 24 to which a circuit is connected for controlling the brightness of the light emitting diode 14 in dependence of the ambient light so that the brightness may be reduced in weak ambient light and increased in intense ambient light, whereby the illuminated aimpoint always is clearly visible in the sight without being blinding, independently of the current light conditions.

The control circuit comprises a light sensor 25 which in principle consists of two Darlington coupled phototransistors, and this light sensor is placed in the inner tube 11, FIG. 1, in the area of the light emitting diode 14. Its field of view is indicated by double dot and dash lines. The light sensor is positioned within the tube such that its field of view is larger than the field of view of the eye by which the shooter looks through the sight, in order that the light sensor shall integrate the ambient light. The proper position of the light sensor to obtain this feature may vary depending on the size and shape of the inner and outer tubes, and on the specifications of the optics. The light emitting diode 14 is connected to the light sensor 25 by a current mirror, comprising two transistors 26 and balanced by two resistors R4 and R5 for obtaining the correct transfer factor from the left to the right transistor 26. The current mirror is a circuit built in a known way, with two current carrying lines wherein the currents in the two lines are maintained in a predetermined ratio. If one current is changed the other current changes so that the ratio between the two currents is maintained. Across the current mirror 10 resistors R6–R15 are connected with a switch 27 by means of which the balance in the mirror may be varied for coarse adjustment of the brightness of the light emitting diode to a value (base value) adapted to current light conditions (i.e. day and night) and to the individual perception of the illuminated aimpoint in the sight. A switch 28 is provided for connection of the light emitting diode and associated control circuit, but this may be replaced by sensor automatics, e.g. an accelerometer which may be connected in such a way that battery voltage is applied to the circuit, when the accelerometer is activated, and the voltage is switched off if the accelerometer is not activated within a given period. A further possibility to switch off the voltage is to use the shut down function in the DC/DC converter.

One inherent characteristic of the described circuit system is that the light emitting diode will twinkle, when the battery voltage approaches a value which is so low that the battery cannot operate the step-up transforming circuit and the light emitting diode. The light emitting diode is turned off when the voltage has dropped to the said value, whereupon the battery voltage recovers to again keep the light emitting diode twinkling during a short interval. The user thereby receives an indication, that battery replacement must take place.

Figure 3:
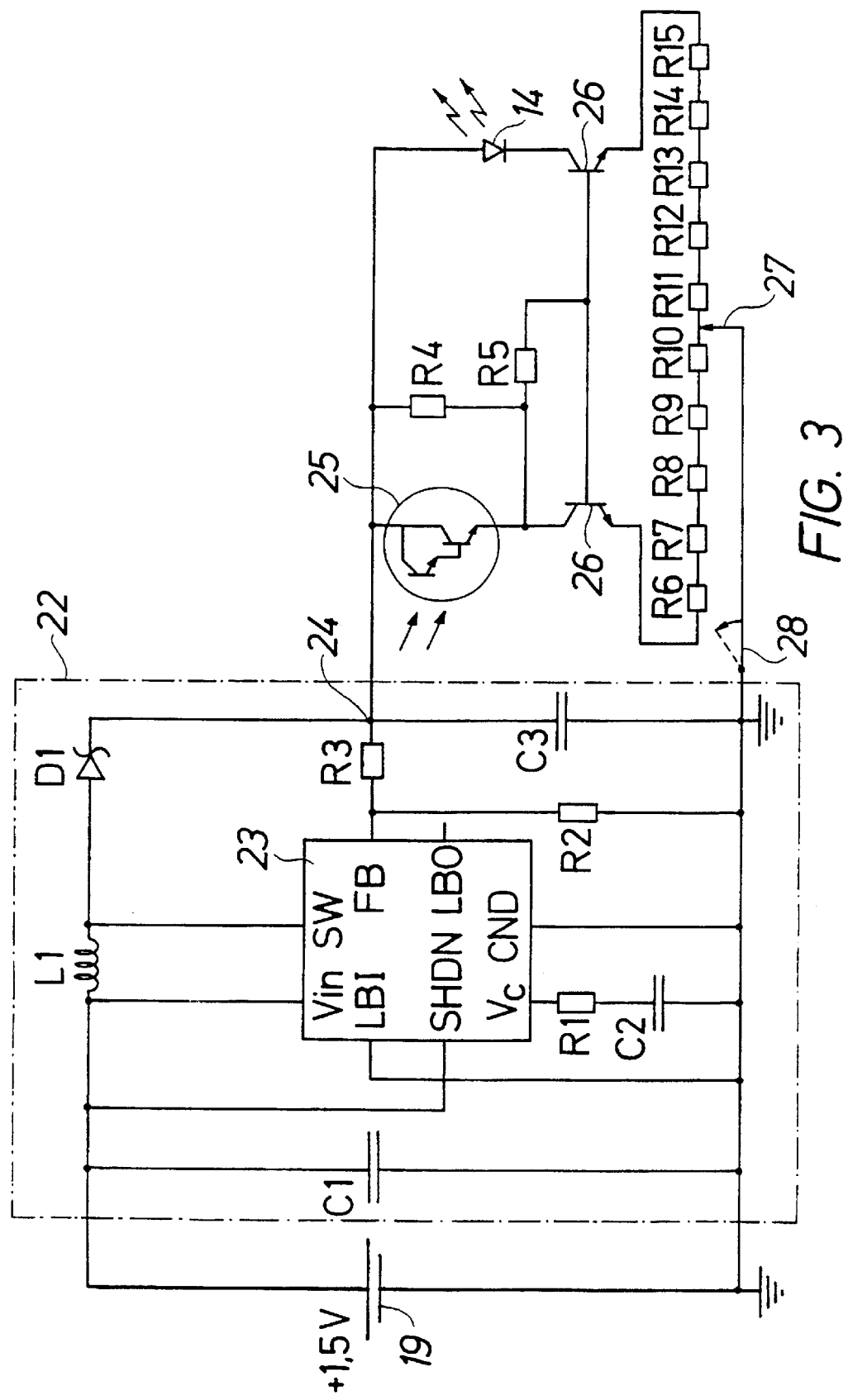
FIG. 3 is a circuit diagram of the electrical circuit system of the sight.

The circuit system in FIG. 3 may as a whole be arranged in the chamber 20 in the battery housing 16 where it is indicated by the block 21, excluding the light emitting diode 14 and the light sensor 25, which, as mentioned, are arranged in the inner tube 11.

What is claimed is:

1. An optical sight comprising:
   a light tunnel;
   a light emitting diode mounted in the light tunnel for providing an illuminated aimpoint visible in the light tunnel; and
   a sensing means sensitive to an ambient light for controlling a brightness of the aimpoint in dependence of an intensity of the ambient light;
   wherein the sensing means sensitive to the ambient light is in the light tunnel.

2. The sight according to claim 1, wherein the sensing means sensitive to the ambient light is in an immediate vicinity of the light emitting diode.

3. The sight according to claim 1, wherein the sensing means sensitive to the ambient light is a photodiode.

4. The sight according to claim 1, wherein the sensing means sensitive to the ambient light comprises two Darlington-coupled photo transistors.

5. The sight according to claim 1, wherein the sensing means sensitive to the ambient light is positioned in the light tunnel such that a field of view of the sensing means is larger than field of view for a person who looks through the light tunnel to observe the illuminated aimpoint.

6. The sight according to claim 1, wherein the light emitting diode is connected to the sensing means sensitive to the ambient light, via a current mirror.

7. The sight according to claim 6, further comprising a variable resistor connected across the current mirror, such that a balance in the current mirror is variable for basic adjustment of the brightness of the light emitting diode by varying the variable resistor.

8. The sight according to claim 1, wherein a power source for the light emitting diode and for the sensing means for controlling the brightness of the aimpoint consists of one single penlight battery of the size AA according to ANSI of 1.5 V, the battery being connected to the light emitting diode via a step-up trans forming circuit with DC/DC converter for increasing a potential supplied to the light emitting diode to at least 1.6 V.

\* \* \* \* \*